United States Patent [19]

Blaushild

[11] Patent Number: 4,576,788

[45] Date of Patent: Mar. 18, 1986

[54] STRADDLE-TYPE SUPPORT STRUCTURE FOR NUCLEAR POWER PLANT PRESSURIZER VALVES

[75] Inventor: Ronald M. Blaushild, Wilkinsburg, Pa.

[73] Assignee: Westinghouse Electric Corp., Pittsburgh, Pa.

[21] Appl. No.: 569,074

[22] Filed: Jan. 9, 1984

[51] Int. Cl.$^4$ ............................................. G21C 13/00
[52] U.S. Cl. .................................... 376/461; 376/463
[58] Field of Search ............... 376/461, 283, 361, 249, 376/307, 203, 260, 413, 302, 304; 248/DIG. 1, 315, 213.2; 220/69, 71, 85 P

[56] References Cited

U.S. PATENT DOCUMENTS 4,426,350  1/1984  Zegar et al. .................... 376/203 X Primary Examiner—Stephen C. Bentley
Assistant Examiner—John S. Maples
Attorney, Agent, or Firm—Daniel C. Abeles

[57] ABSTRACT

A support system for supporting a pressurizer safety and relief valve system above a pressurizer vessel of a pressurized water reactor, which comprises an upper ring section that rests on the dome of the pressurizer, a lower ring section having sleeves attached thereto, and a plurality of arcuate connecting sections, conforming to the shape of the dome. Columnar supports for the valve system are supported in the sleeves on the lower ring and collars are attached to the arcuate sections stabilize the columnar supports.

8 Claims, 4 Drawing Figures

STRADDLE-TYPE SUPPORT STRUCTURE FOR NUCLEAR POWER PLANT PRESSURIZER VALVES

CROSS-REFERENCE TO RELATED INVENTION

Reference is made to the application of the present inventor, filed on even date herewith, Ser. No. 569,073, entitled "Stirrup-Type Support Structure for Nuclear Power Plant Pressurizer Valves".

BACKGROUND OF THE INVENTION

The present invention relates to a support structure for supporting a pressurizer safety and relief valve system above the pressurizer vessel of a pressurized water nuclear reactor power plant.

A pressurizer vessel is used in a pressurized water nuclear reactor power plant to provide relief for coolant overpressure. Usually, such a pressurizer vessel is a vertical, thick-walled vessel having a hemispherical top, or dome, and having its bottom end supported by a flanged skirt.

Relief valves are provided for a first level of overpressure protection and safety valves are provided for a second level of overpressure protection. The unit thus comprises a pressurizer relief and safety valve system that has a manifold or header assembly and connections for nozzles in the head of the pressurizer, with piping and discharge outlets provided.

A pressurizer safety and relief valve system which is supported above the pressurizer on columnar supports is described in co-pending application Ser. No. 229,363, entitled "Improved Valve Support Arrangement for Pressurizer in a Nuclear Power Plant", filed Jan. 29, 1981, now U.S. Pat. No. 4,426,350, in the names of Martin J. Zegar, et al., assigned to the assignee of the present invention, which application is incorporated by reference herein. In said co-pending application, an arrangement for supporting the pressurizer safety and relief valve system is described wherein a common header is secured to the side walls of the pressurizer vessel by the use of columnar supports that are secured to the header and are secured to the pressurizer side wall by the use of lug means. The lug means which are attached to the pressurizer side wall must be capable of supporting the load of the columnar supports and pressurizer safety and relief valve system and could become overstressed for some combinations of loads, and also must be of sufficient dimensions if they are to support the necessary loads.

It is an object of the present invention to provide a support structure for supporting a pressurizer safety and relief valve system above a pressurizer vessel without the use of lugs on the pressurizer vessel to support the vertical load of the system.

It is another object of the present invention to provide a support structure for supporting a pressurizer safety and relief valve system above a pressurizer vessel where the dome of the vessel is used to support the load of the system

SUMMARY OF THE INVENTION

A support structure for supporting a pressurizer safety and relief valve system above a pressurizer vessel on columnar supports has an upper ring section which rests on the dome of the pressurizer vessel, a lower ring portion which encircles the pressurizer vessel wall below the dome, and a plurality of arcuate connecting sections which conform to the shape of the dome and connect the two ring sections. A plurality of sleeves are provided on the lower ring section which surround the columnar supports, and means are provided to support the columnar supports of the valve system within the sleeves. Preferably, flanges are provided on the columnar supports which rest on the sleeves attached to the lower ring section, and collars are attached to the arcuate connecting sections through which the columnar supports pass and are stabilized.

DETAILED DESCRIPTION

A pressurizer safety and relief valve system, that includes a manifold assembly and associated piping and valves, is carried on columnar supports that are supported by a support structure that does not use lugs on the vessel side wall to support a downward vertical load. The present support system prevents overstressing of lugs on the pressurizer wall, eliminates the influence of temperature variations on the support structure and simplifies fabrication, installation and inspection of the system.

Figure 1:
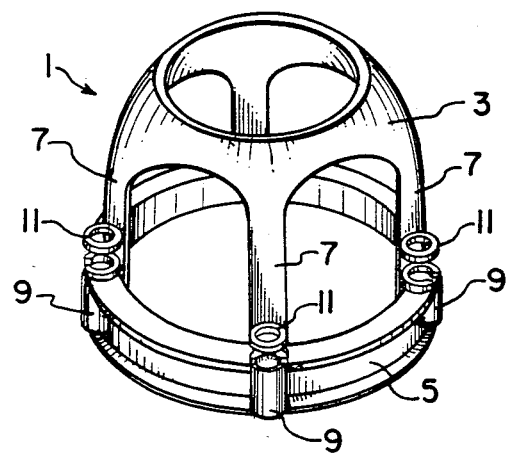
FIG. 1 is a perspective view of the support structure of the present invention.

Referring now to FIG. 1, te support structure 1, comprises an upper ring section 3 that conforms to the dimensions of the top portion of the pressurizer vessel dome, and is adapted to rest on said top portion. A lower ring section 5 is designed to closely encircle the pressurizer vessel wall, adjacent the lower portion of the pressurizer vessel dome, and is connected to the upper ring 3 by means of a plurality of arcuate connecting sections 7. The arcuate connecting sections 7 extend between the two ring sections and conform to the shape of the dome of the pressurizer vessel.

A sleeve 9 is attached to the lower ring section 5 into which columnar supports for the pressurizer safety and relief valve system fit, with a sleeve 9 provided at the location of the arcuate connecting sections 7. A collar 11 is also provided to stabilize the columnar supports, with a collar positioned above each sleeve 9 and being attached to each of arcuate connecting sections 7.

Figure 2:
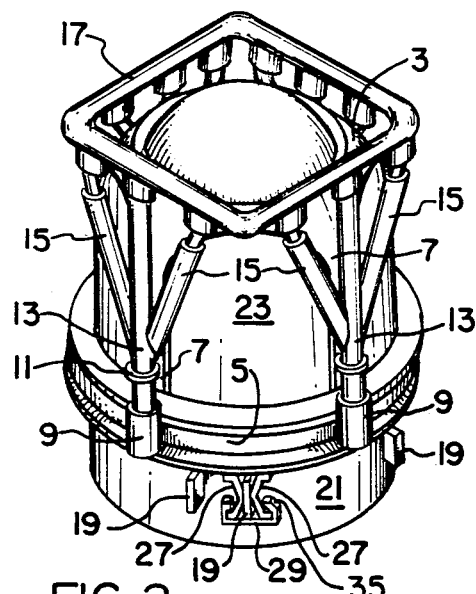
FIG. 2 is a perspective view of the support structure of FIG. 1 on a pressurizer vessel supporting a pressurizer safety and relief valve system.
Figure 4:
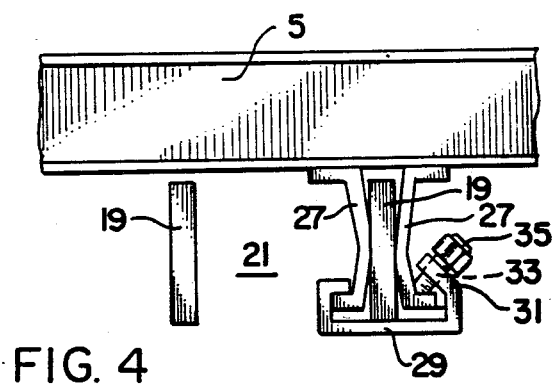
FIG. 4 is a view of a restraining means on the lower ring which contacts lugs on the pressurizer wall to prevent horizontal and upward vertical movement of the support structure.

As illustrated in FIG. 2, the support structure supports columnar supports which preferably comprise a vertical column 13 and angularly directed struts 15, which columnar supports support the manifold 17 and associated piping of the pressurizer safety and relief valve system above the pressurizer vessel. Lugs 19 which are present on the pressurizer side wall 21, do not support any vertical load from the pressurizer safety and relief valve support structure 1, but rather, the support structure is supported by the dome 23 of the pressurizer vessel through upper ring section 3 and arcuate connecting sections 7. This is best illustrated in FIG. 4, which shows a gap between the bottom of the lower ring section 5 and the top of the lugs 19. This arrangement spreads the vertical load of the pressurizer safety and relief valve system on the pressurizer dome instead of concentrating the load on lugs attached to the side wall of the pressurizer vessel.

Figure 3:
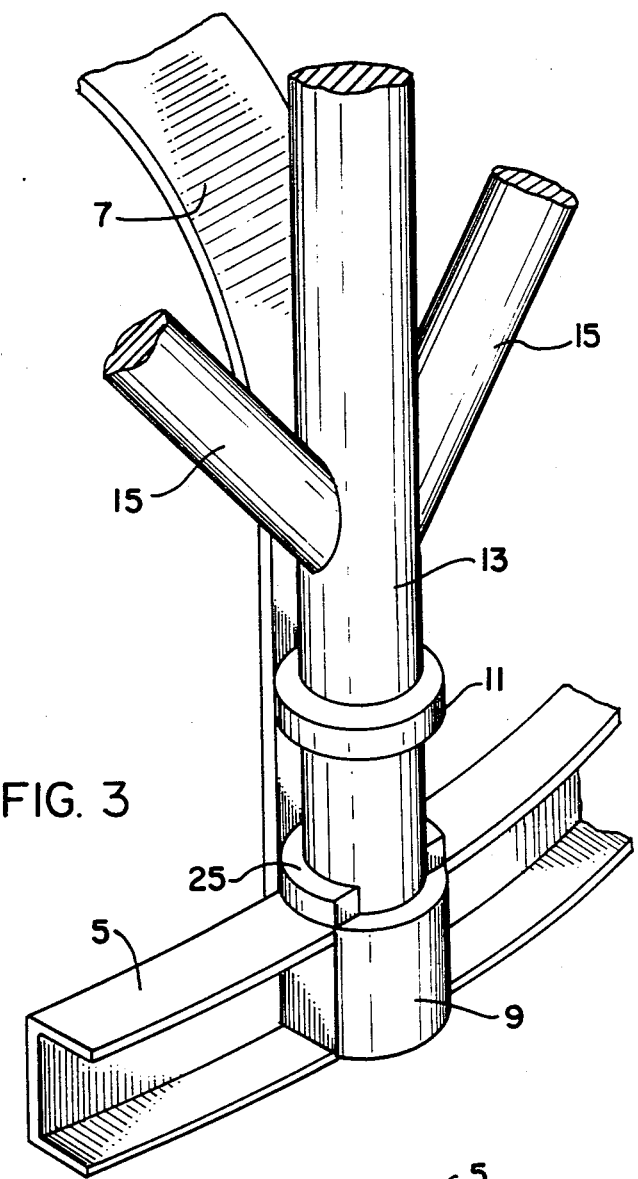
FIG. 3 shows the use of a flange on the columnar support for use in supporting the columnar support in a sleeve.

Means are provided to support the columnar supports 13 in the sleeves 9. In one embodiment, illustrated in FIG. 3, flange 25 is affixed to the lower portion of the columnar support 13, and the flange rests on the top of the sleeve 9 which is attached to the lower ring 5, and preferably the flange 25 comprises a flange of an arcuate shape which is affixed to the column 13 and extends inwardly towards the adjacent arcuate connecting section 7.

In order to restrain the support structure from movement in a horizontal direction, in a direction around the periphery of the vessel wall, restraining means may be provided on the lower ring section which will coact with the lugs on the vessel wall. As illustrated in FIG. 4, a pair of spaced downwardly depending U-shaped channels 27 are attached to the lower ring section 5, which are spaced apart a distance which will permit placement of one of the channels on each side of a lug 19, attached to the side wall 21 of the pressurizer vessel. A closure block 29 is provided which fits over the lower ends of the U-shaped channels 27, and encloses the lug 19. An extension 31 may be provided on one side of the closure block 29, which extension extends above one of the legs of the U-shaped channel 27, and a threaded aperture 33 is provided in the extension 31 through which a bolt 35 may be threaded. The U-shaped brackets 27 are so designed as to contact the lug 19 at the middle portion thereof to transfer horizontal forces to the middle of the bracket. This contact eliminates undesirable torsional stresses in the plane of the lug-to-wall contact surface. The closure block 29 absorbs vertical upward forces. The closure block 29, with bolt 35 is removable from the U-shaped brackets 27 and the use of the bolt 29 enables tightening of the brackets 27 on the lug 19 without the need for shims or other compensating means.

The present support structure for a pressurizer safety and relief valve system is applicable to new designs of pressurizers, having a dome top, and is also adapted for use on existing pressurizers. The support structure allows optimum access to different parts of the structure for inspection purposes, and the use thereof will result in less labor cost and less possible radiation exposure during the installation, removal, or inspection of the system.

I claim:

1. A support structure for supporting a pressurizer safety and relief valve system of a pressurized water reactor, said system being mounted on columnar supports above a pressurizer vessel, the dome of said pressurizer vessel having a top portion of a smaller diameter than the bottom portion thereof, comprising:
    an upper ring section adapted to rest on the top portion of said pressurizer vessel dome;
    a lower ring section adapted to encircle the pressurizer vessel side wall at a location adjacent the bottom portion of said pressurizer vessel dome;
    a plurality of arcuate connecting sections extending between said upper and lower ring sections, and conforming to the shape of said pressurizer vessel dome;
    a plurality of sleeves attached to said lower ring adjacent said arcuate connecting section; and
    means for supporting the columnar supports of said pressurizer safety and relief valve system within said sleeves.

2. The support structure for supporting a pressurizer safety and relief valve system of a pressurized water reactor as defined in claim 1 including a collar attached to each of said arcuate connecting sections through which said columnar supports pass to stabilize said columnar supports in said sleeves.

3. The support structure for supporting a pressurizer safety and relief valve system of a pressurized water reactor as defined in claim 2 wherein said means for supporting said columnar supports comprises a flange on said columnar supports, which flange rests on said sleeve.

4. The support structure for supporting a pressurizer safety and relief valve system of a pressurized water reactor as defined in claim 3 wherein said flange is of an arcuate shape and is positioned between the columnar supports and said arcuate connecting section.

5. The support structure for supporting a pressurizer safety and relief valve system of a pressurized water reactor as defined in claim 1 including lugs on the side wall of the pressurizer vessel, and wherein said lower ring section has restraining means thereon which contact said lugs to restrict horizontal movement of said support structure.

6. The support structure for supporting a pressurizer safety and relief valve system of a pressurized water reactor as defined in claim 5 wherein said restraining means comprises a downwardly depending U-shaped channel on each side of said lug, which channel contacts the lug at the center portion thereof.

7. The support structure for supporting a pressurizer safety and relief valve system of a pressurized water reactor as defined in claim 6 including a closure block connecting the ends of said U-shaped channel and enclosing said lug to prevent upward movement off the lower ring relative to said channel.

8. The support structure for supporting a pressurizer safety and relief valve system of a pressurized water reactor as defined in claim 7 wherein said closure block has releasable means thereon for connecting said closure block to said U-shaped channels and to said lug.

* * * * *